Jan. 15, 19  3,786,119

Filed Dec. 6, 1971  2 Sheets-Sheet 1

United States Patent Office 3,786,119
Patented Jan. 15, 1974

3,786,119
METHOD FOR PRODUCING OPTICAL
POLARIZING ELEMENTS
Claude Ortlieb, Strasbourg-Meinau, France, assignor to
Vergo S.A., Illkirch-Graffenstaden, Bas-Rhin, France
Filed Dec. 6, 1971, Ser. No. 204,811
Claims priority, application France, Dec. 14, 1970,
7045504
Int. Cl. B29d 11/00
U.S. Cl. 264—2                                    1 Claim

ABSTRACT OF THE DISCLOSURE

Optical polarizing elements are produced by cutting from a rigid sheet of polarizing plastic material, screens of appropriate form with suitable axial direction. These screens are then curved under vacuum when hot. The curved screens are coated with an attachment varnish and then placed in a mold which is filled with a polymerizable or polycondensable liquid resin. If the screen is of higher specific gravity than the resin, then the curvature of the screen will be less than that of the resin; while if the screen is of lower specific gravity than the resin, then the screen is more sharply curved than the mold, so that in either event the screen, falling or rising through the resin, will contact the mold only about the edges of the screen.

INTRODUCTION AND BACKGROUND OF THE INVENTION

Figure 1:
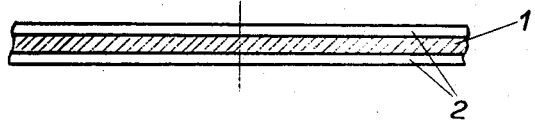

The present invention has for an object a method for the manufacture of spectacle glasses and optical lenses of organic material which, apart from their protective or vision-correcting properties, also cause a linear polarization of the light passing through them.

Another object of the invention is the realization of semi-finished polarizing discs of organic material permitting, after optical surfacing, of obtaining corrective, spherical, aspherical, toroidal, lenticular, mono-focal or multi-focal polarizing spectacle glasses, and the realization of polarizing optical lenses of organic material intended to be mounted in optical instruments for observation, measurement, sighting or photography.

BRIEF SUMMARY OF THE INVENTION

The method according to the invention, permitting the realization of the above-mentioned articles consists in cutting, from a rigid sheet of polarizing plastic material, screens of appropriate form with suitable axial direction, in curving these screens with a suitable radius of curvature, in covering the curved screens with an attachment varnish, in placing them in appropriate moulds, in filling the intervals of the said mould with a polymerizable or polycondensable liquid resin, in causing polymerization of the said resin and finally in opening the mould to withdraw the finished polarizing spectacle eyepiece or optical lens therefrom.

In certain cases, in a subsequent manufacturing phase, the definitive form will be imparted to the lens by an optical surfacing method.

BRIEF DESCRIPTION OF THE VIEWS IN THE DRAWINGS

Figure 2:
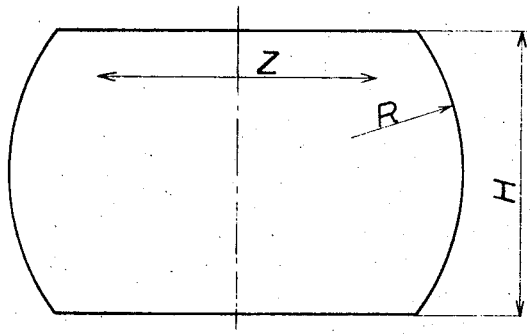
Figure 3A:
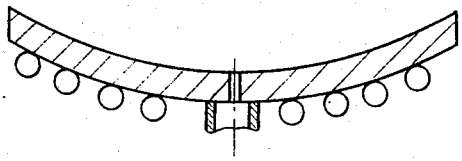
Figure 3B:
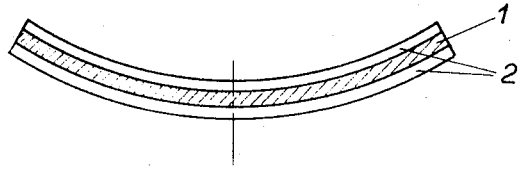
Figure 4:
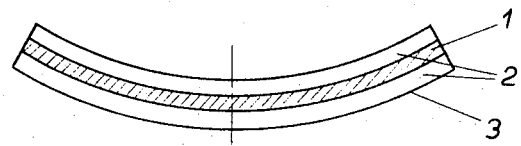
Figure 5:
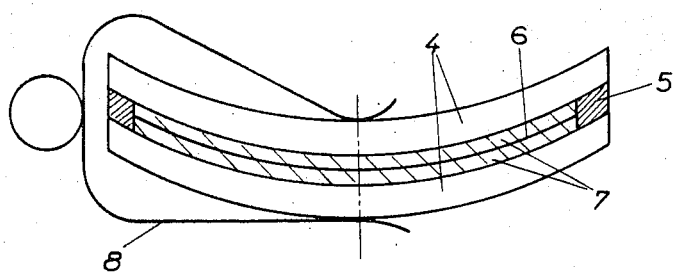
Figure 6:
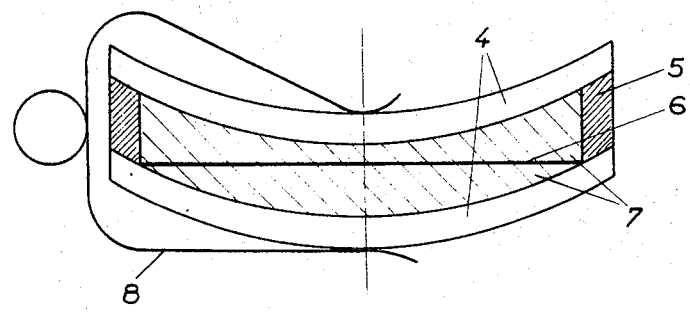
Figure 7:
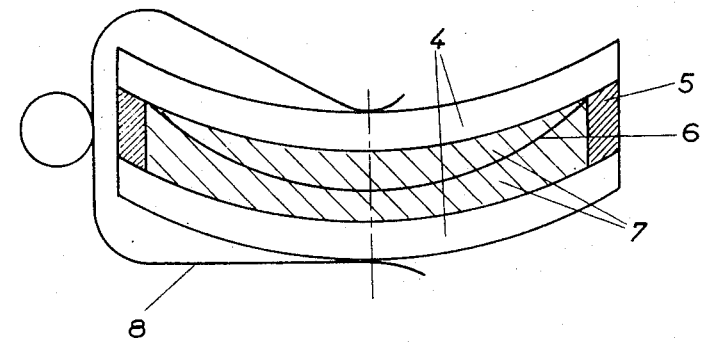

The accompanying drawings illustrate by way of example a method for the manufacture of a polarizing screen. In the drawings:

FIG. 1 is a partial sectional view of a plate of polarizing plastic material,
FIG. 2 is a plan view of a cut-out screen,
FIGS 3a and 3b illustrate the vacuum shaping of the screen,
FIG. 4 represents a polarizing screen which is curved and covered with its attachment varnish,
FIGS 5, 6 and 7 show three forms of moulds permitting the final coating of the screen.

DETAILED DESCRIPTION OF THE PREFERRED EMBODIMENTS

As represented in the accompanying drawings, for the manufacturing method according to the invention there are used rigid, laminated plates or sheets of polarizing plastic material, as shown by FIG. 1. These plates generally comprise a polarizing film 1 of colored polyvinyl alcohol and on either side a sheet of colorless or colored cellulose ester 2, stuck to the polarizing film and intended to protect it. The total thickness of these polarizing plates is generally between 0.7 and 0.8 mm.

The nature, structure and method for obtaining these polarizing plates are not limitative of the present invention, provided that they permit carrying out the operations described below.

The invention consists in cutting from these plates or sheets, by appropriate means such as the guillotine and punch, screens having a form permitting of subsequent introduction into the coating mould. By way of non-limitative example the form as represented in FIG. 2 is especially appropriate for the execution of the following phases. In this figure the axis of polarization is designated by Z.

These screens are thereafter curved in accordance with one of the known methods, such as shaping under high frequency or by ultra-sonics or in vacuo, the latter being illustrated by FIGS. 3a and 3b. FIG. 3a represents a curving dish of stainless steel, aluminium, copper or any other heat-conductive material having a sufficiently smooth surface so as not to damage the screen to be curved. This dish is heated by any means, for example coils in which a hot fluid circulates, welded or stuck to its convex surface. Through a small central hole, connected to a pumping device (not shown), a powerful suction is caused which has the effect of drawing the screen flat against the dish the form of which it follows as shown by FIG. 3b. After cooling the curved screen is ready for the following phase.

The polarizing screens as just described generally adhere insufficiently, if at all, to the coating resins utilized in optics. Therefore one is obliged in a third phase to coat or cover the said screens with one or more attachment varnishes capable of improving the connections between screen and coating resin, while being compatible with both. These varnishes must be transparent and may be colored or colorless. By way of non-limitative example these varnishes will be of the cellulose, vinyl, epoxy or polyurethane type, pure or in mixture. The solvents utilized must attack the surface of the screens little if at all, so as to preserve their transparency and clarity. The utilizable coloring agents are those which are soluble in the said varnishes while being fast to light and compatible with the resin. By way of non-limitative example the colored organo-metallic complexes give good results. Finally to facilitate their application and improve their adhesion these varnishes can contain one or more reactive or non-reactive plasticizers. By way of non-limitative example the non-reactive plasticizers such as dibutyl or dioctyl phthalate and the reactive plasticizers such as diallyl phthalate, and allyl diglycol-carbonate give very good results.

One varnish composition utilized successfully for carrying out the invention is for example the following:

40 g. of the composition as follows: Polyvinyl butyral 69–71%, polyvinyl acetate 2%, polyvinyl alcohol 25–

27%, are dissolved in a litre of normal butanol, 10 g. of allyl diglycolcarbonate are added as reactive plasticizer to the solution. The application of this attachment varnish is effected by brushing, by spray gun or by dipping, the best results being obtained by the last-mentioned method.

FIG. 4 represents a polarizing screen which has been curved and covered with its attachment varnish 3.

The partial or complete drying of this varnish can be effected at room temperature or in a heating cabinet, but always at a temperature below the softening temperature of the screen (which in the example cited is 90° C.) and always with protection from dust.

The curved and varnished polarizing screen is then placed in the mould in which the final coating will take place. This mould, as shown by FIG. 5, comprises four parts, namely two matrices 4, a packing 5 and a gripper 8. The matrices 4 can be of polished stainless steel or polished glass or any other material which can be subjected to a polishing of optical quality and is compatible with the coating resin. The best results are obtained with polished glass. The packing 5 is made of an elastic material compatible with the coating resin, such for example as polyvinyl chloride plasticized by a non-migrant plasticizer or high-pressure polyethylene plasticized by butyl rubber. The gripper 8 is of spring steel and serves to ensure the sealing of the mould.

According to the nature of the spectacle eyepiece or lens which it is desired to obtain, the shape, dimensions and curvatures of the matrices and the packing will be different. The same applies to the polarizing screen placed in the mould.

As regards the degree of curvature of the later, three cases are to be distinguished:

If the lens to be moulded is sufficiently thin, the screen 6 will be curved with a radius of curvature intermediate between those of the two matrices 4 of the mould, as shown by FIG. 5. The coating resin 7 will be distributed from the two sides of the screen 6 by capillary action and the coating will be perfect irrespective of the density of the resin and that of the screen.

If the lens to be moulded is thicker and if the resin is less dense than the screen, which is the general case, the screen will be given a radius of curvature greater than that of the concave matrix, as shown by FIG. 6, so that it may bear upon the extreme edge of the latter when dropping to the bottom of the mould.

In the case where the resin is denser than the polarizing screen, the later will float to the surface and is in danger of sticking against the convex matrix. It will be given a smaller radius of curvature than that of the convex matrix, as shown by FIG. 7, so that it rests upon the extreme edge of the latter.

When polarizing screen is in place and the mould is closed, after removal of dust, the interval of the mould is filled with a polymerizable or polycondensable liquid resin with the aid of a flat nozzle introduced between one of the matrices 4 and the packing 5.

The coating resins must be transparent, optically homogeneous and compatible with the varnished polarizing screen. Liquid monomers, liquid pre-polymers or solutions of polymers in monomers may be used. They will be pure or mixed with one another. By way of non-limitative examples the vinyl monomers such as styrene, acrylic or allyl derivatives, polycondensable pre-polymers such as urea-formaldehyde or phenol-formaldehyde are good coating resins.

They may be colorless or colored with the aid of soluble coloring agents or very finely divided pigment coloring agents such for example as carbon black dispersed in dibutyl phthalate.

They may further contain one or more ultra-violet-absorbing and/or infra-red-absorbing products.

Finally in the majority of cases they will contain one or more polymerization or polycondensation catalysts such for example as isopropyl percarbonate, cyclohexyl percarbonate or the organic peroxides.

Their polymerization or polycondensation can be effected at room temperature and without other influence, but it can also be caused or accelerated by heat, ultraviolet, infra-red or ionizing radiations.

The opening of the mould can be effected as soon as the coating resin is solid, but in most cases the finish of the polymerization or polycondensation will be awaited before the mould is opened.

The lens removed from the mould is ready for use, except in the case of semi-finished discs, and its optical quality depends only upon that of the surfaces of the two matrices and of the coating resin.

As regards the semi-finished discs, it is possible by known optical surfacing methods to cut one or both faces in order to impart the desired form and curvature thereto and thus to produce complex and special lenses.

By way of non-limitative example and to illustrate the last phases of the method, the polarizing screen is cut out according to FIG. 2 with the aid of a punch. Its dimensions are as follows: $H=60$ mm., $R=38$ mm., thickness $=0.75$ mm. The screen is then curved with a radius of curvature of 87.3 mm. It is varnished by dipping with the varnish the formula of which appears above. After thirty minutes of drying at room temperature and with protection from dust, it is placed in a mould the characteristics of which are the following:

The matrices 4 are of optically polished glass and have as radii of curvature $+86.73$ mm. and $-87.46$ mm. and as diameter 80 mm. Their thickness is 4 mm. The packing 5 is of polyvinyl chloride plasticized with a non-migrant plasticizer, injected by worm press. It measures 75 mm. in internal diameter and 80 mm. in external diameter. The mould is washed with acetone, then dusted with a jet of air. It is coated with the aid of a gripper 8 of spring steel.

The coating resin is allyl diglycol-carbonate, in which there are dissolved 3% of isopropyl percarbonate as catalyst and 0.1% of an ultra-violet ray absorbent.

The closed and filled mould containing the polarizing screen is placed flat, the convex side downwards, in a drying cabinet with forced ventilation the temperature of which is increased progressively from 20 to 90° C. in fourteen hours with the aid of a programme pyrometer. Then it is left to cool for two hours, the gripper 8 and the packing 5 are removed, then with the aid of a small lever of wood or plastic material the two matrices are separated and the finished eyepiece is withdrawn therefrom. The eyepieces thus obtained can be ground, milled, sawn, drilled like all known organic glasses. Their fitting into spectacle frames thus presents no difficulty.

It is likewise possible to color them by dipping into an aqueous coloring bath in accordance with a known method.

The invention also has for an object the spectacle glasses, lenses and semi-finished discs obtained by the method as described above.

What is claimed is:

1. A method for making spectacle glasses, optical lenses and semi-finished discs of organic material which polarize light, comprising forming to a predetermined curvature a rigid screen of polarizing material about 0.7 to 0.8 mm. thick, covering the formed screen with an adhesive material containing a reactive plasticizer, placing the coated screen in a curved mold, filling the curved mold with a polymerizable monomer about the screen, polymerizing the monomer, and removing the molded object from the mold, the radius of curvature of the screen being different from that of the mold and the specific gravity of the screen being different from that of the monomer, the radius of curvature of the screen being less than that of the mold when the specific gravity of the monomer is greater than that of the screen, and greater than that of the mold when the specific gravity of the monomer is less than that of the screen, whereby the screen will move vertically by gravity through the monomer and come to rest on a side wall of the mold only about the edge of the screen.

References Cited

UNITED STATES PATENTS

| | | | |
|---|---|---|---|
| 2,397,231 | 3/1946 | Barnes | 264—2 |
| 3,673,055 | 6/1972 | Sheld | 351—166 UX |
| 3,051,054 | 8/1962 | Crandon | 264—2 |
| 2,577,620 | 12/1951 | Mahler | 350—155 X |
| 3,560,076 | 2/1971 | Ceppi | 350—155 |
| 2,387,308 | 10/1945 | Styll | 264—2 |
| 3,674,587 | 7/1972 | La Liberte | 350—155 UX |

OTHER REFERENCES

Skeist, Handbook of Adhesives, 415–17 (1962).

ROBERT F. WHITE, Primary Examiner

A. M. SOKAL, Assistant Examiner

U.S. Cl. X.R.

264—135, 275; 350—155